United States Patent
Chang et al.

(10) Patent No.: US 10,318,692 B2
(45) Date of Patent: *Jun. 11, 2019

(54) SCALABLE CHIP PLACEMENT

(71) Applicant: Synopsys, Inc., Mountain View, CA (US)

(72) Inventors: Douglas Chang, San Jose, CA (US); Balkrishna R. Rashingkar, San Jose, CA (US)

(73) Assignee: SYNOPSYS, INC., Mountain View, CA (US)

( * ) Notice: Subject to any disclaimer, the term of this patent is extended or adjusted under 35 U.S.C. 154(b) by 480 days.

This patent is subject to a terminal disclaimer.

(21) Appl. No.: 14/665,716

(22) Filed: Mar. 23, 2015

(65) Prior Publication Data

US 2016/0283632 A1 Sep. 29, 2016

(51) Int. Cl.
*G06F 17/50* (2006.01)

(52) U.S. Cl.
CPC ...... *G06F 17/5072* (2013.01); *G06F 2217/12* (2013.01); *Y02P 90/265* (2015.11)

(58) Field of Classification Search
CPC .................................................. G06F 17/5072
See application file for complete search history.

(56) References Cited

U.S. PATENT DOCUMENTS

| | | | | |
|---|---|---|---|---|
| 8,694,302 | B1 * | 4/2014 | Ho | G06F 17/5036 703/13 |
| 8,910,097 | B2 * | 12/2014 | Chang | G06F 17/505 716/103 |
| 2005/0198605 | A1 * | 9/2005 | Knol | G06F 17/5072 716/124 |

\* cited by examiner

*Primary Examiner* — Vuthe Siek
*Assistant Examiner* — Aric Lin
(74) *Attorney, Agent, or Firm* — Park, Vaughan, Fleming & Dowler LLP; Laxman Sahasrabuddhe

(57) ABSTRACT

Some embodiments can receive a netlist for the circuit design, wherein the netlist is divided into a set of blocks and a top-level netlist. Next, the embodiments can create (1) a top-level netlist abstraction based on the top-level netlist, and (2) for each block in the set of blocks, create a block abstraction based on a portion of the netlist that is in the block and create virtual pin cells in the block, wherein each virtual pin cell corresponds to a connection that crosses a boundary of the block. The embodiments can then place the top-level netlist abstraction in the layout area, the set of blocks in the layout area, the block abstractions in corresponding blocks, and the virtual pin cells in corresponding blocks. The placed circuit abstraction can then be used to drive standard cell placement in the circuit design.

15 Claims, 6 Drawing Sheets

SCALABLE CHIP PLACEMENT

TECHNICAL FIELD

This disclosure relates to electronic design automation (EDA). More specifically, this disclosure relates to scalable chip placement.

BACKGROUND

Related Art

Advances in process technology and a practically unlimited appetite for consumer electronics have fueled a rapid increase in the size and complexity of integrated circuit (IC) designs. The performance of EDA tools is very important because it reduces the time to market for IC designs. Placement is an important stage in an EDA design flow that involves determining locations for various objects (blocks, modules, circuit elements, etc.) in the IC layout. The quality of the placement can significantly impact the overall quality of the final design.

Unfortunately, due to the rapid increase in the size and complexity of IC designs, conventional placement tools can require a very long time to perform placement on a circuit design, and the quality of the placed circuit design is often poor.

SUMMARY

Some embodiments described herein provide methods and systems for placing a circuit design. Specifically, some embodiments can receive a netlist for the circuit design, wherein the netlist for the circuit design is divided into a set of blocks and a top-level netlist. In some embodiments the block boundaries and block locations are fixed. The embodiments can then create a top-level netlist abstraction based on the top-level netlist. Next, for each block in the set of blocks, the embodiments can create a block abstraction based on a portion of the netlist that is in the block and create virtual pin cells in the block, wherein each virtual pin cell corresponds to a connection that crosses a boundary of the block. The embodiments can then place the top-level netlist abstraction in the layout area, the block abstractions in corresponding blocks, and the virtual pin cells in corresponding blocks.

Specifically, the total size of the top-level netlist abstraction, the block abstractions, and virtual pin cells can be small enough to fit in a computer memory. Accordingly, some embodiments can load, in the computer memory (e.g., dynamic random access memory), the top-level netlist abstraction, the block abstractions, and virtual pin cells, and then perform placement.

Some embodiments can create a first set of pin placement constraints for driving the top-level netlist placement based on the placed virtual pin cells, and place the top-level netlist based on the first set of pin placement constraints. For each block in the set of blocks, the embodiments can create a second set of pin placement constraints for driving block placement based on the placed virtual pin cells and the placed top-level netlist (i.e., placed standard cells in the top-level netlist). In these embodiments, the block-level standard cell placement is performed after standard cells for the top-level netlist have been placed. In other embodiments, the second set of pin placement constraints for driving block placement can be created based on the placed virtual pin cells and the placed top-level netlist abstraction. In these embodiments, the standard cell placement for the top-level netlist can be performed concurrently with the standard cell placement for the block-level netlists.

In some embodiments, creating the set of pin placements can comprise determining a bounding box for a net that electrically connects a virtual pin cell in the block to at least one object external to the block, and creating a pin placement constraint based on an intersection between the bounding box and the block.

In some embodiments, creating the set of pin placements can comprise identifying an edge of the block that is closest to a driver pin in a net that electrically connects a virtual pin cell in the block to at least one object external to the block, and creating a pin placement constraint based on the identified edge of the block.

In some embodiments, creating the set of pin placements can comprise identifying an external object that is closest to a virtual pin cell in the block, and that is on a net that electrically connects the virtual pin cell with one or more external object, and creating a pin placement constraint based on the identified external object.

Note that the circuit elements in the netlist for the circuit design can be organized in a logical hierarchy (LH). Some embodiments can create the top-level netlist abstraction based on the top-level netlist by: (1) identifying a set of LH nodes that is in the top-level netlist, and (2) creating the top-level netlist abstraction by, for each LH node in the set of LH nodes, replacing a portion of the netlist that is below the LH node in the LH with a star netlist, wherein the star netlist includes a center object that is electrically connected to a set of satellite objects, wherein each satellite object corresponds to a port of the LH node. Likewise, the embodiments can create the block abstraction based on the portion of the netlist that is in the block by: (1) identifying a set of LH nodes that is in the block, and (2) creating the block abstraction by, for each LH node in the set of LH nodes, replacing a portion of the netlist that is below the LH node in the LH with a star netlist, wherein the star netlist includes a center object that is electrically connected to a set of satellite objects, wherein each satellite object corresponds to a port of the LH node.

DETAILED DESCRIPTION

Figure 1:
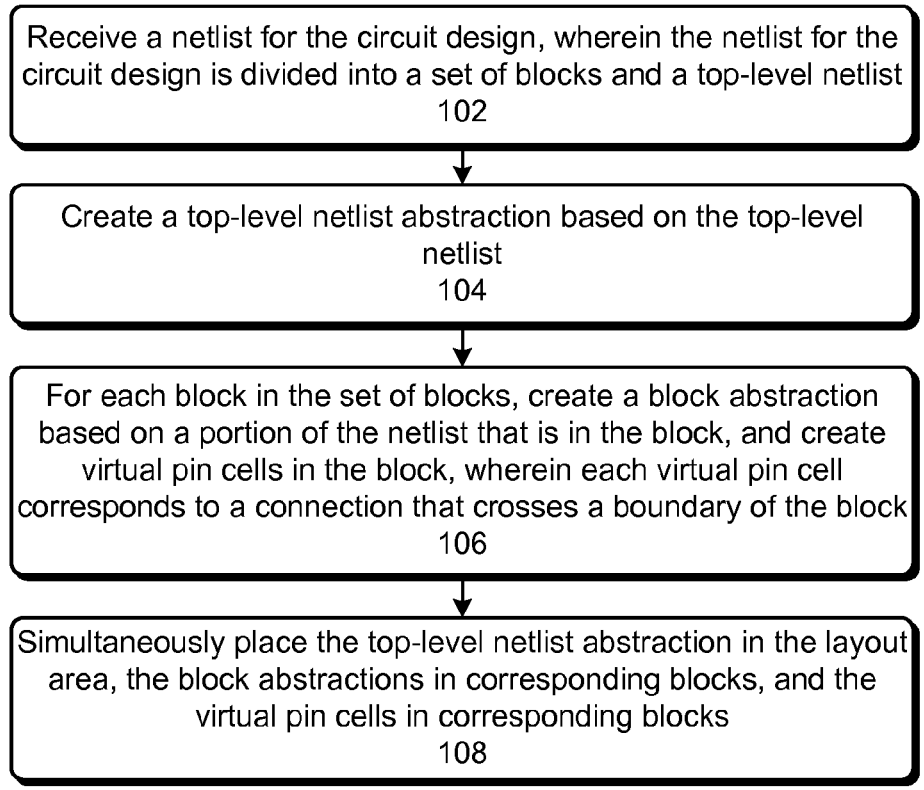
FIG. 1 illustrates a process for circuit placement in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an EDA Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks, which are used during fabrication.

Scalable Chip Placement

For many large circuit designs the entire netlist does not fit in the memory (e.g., dynamic random access memory) that is available on the computer. Therefore, conventional placers use an iterative process to place the circuit design. The first step involves top-level placement of circuit blocks. In this step, the circuit blocks do not include details of the netlist within each block. Specifically, the pins of each block are assumed to be at the center of the block, and the blocks are placed based on user provided placement constraints (e.g., a circuit designer may provide placement constraints based on the circuit designer's knowledge of the data flow) and area constraints. In the second step, the pin locations of each block are determined based on the connections between the circuit blocks. The details of the netlist in each block are still not loaded in memory because of memory constraints. Finally, in the third step, the details of each block are loaded into memory and the netlist within each block is placed. Note that the third step cannot be performed for the entire circuit design at once due to memory constraints; therefore, the third step is performed in a piecemeal fashion. For example, placement can be performed one circuit block at a time or a few circuit blocks at a time depending on the circuit block sizes and the available memory. If the quality of the placement is poor (as is usually the case after the first iteration), then the circuit designer has to go back to the first step and try to improve the top-level placement by providing additional placement constraints. Consequently, conventional approaches often require multiple iterations to place the circuit design, and the quality of the placed circuit design is often very poor.

Some embodiments described herein use circuit abstractions to substantially improve the speed and the quality of results, especially for large circuit designs. A circuit abstraction is a representation of a circuit design that does not include all of the details of the circuit design. Specifically, some embodiments described herein divide the entire netlist into a set of netlist portions, and create a circuit abstraction for each netlist portion, wherein the circuit abstractions retain area information for each netlist portion, and the logical connectivity information between the netlist portions. Note that the circuit abstraction for each netlist portion is substantially smaller in size (i.e., in terms of memory requirements) than the netlist portion itself.

Once the circuit abstractions for the netlist portions have been determined, they can all be loaded into the computer memory simultaneously. Next, the embodiments can place the circuit abstractions. Note that, in this step, the embodiments have a global view of the area and logical connectivity requirements for the entire circuit design because the circuit abstractions for all of the netlist portions have been loaded into memory. The placed abstractions can then be used to drive the standard cell placement for each netlist portion. Specifically, pin placement constraints for each circuit block can be generated based on the placed netlist abstractions, and standard cells can be placed in each circuit block based on the pin placement constraints.

FIG. 1 illustrates a process for circuit placement in accordance with some embodiments described herein. The process can begin by receiving a netlist for the circuit design, wherein the netlist for the circuit design is divided into a set of blocks and a top-level netlist (operation 102). The shape, size, and location of each block in the set of blocks can be known and fixed at this stage in the process. However, the pin locations and the standard cell locations within each block are not known at this stage in the process. The process can then create a top-level netlist abstraction based on the top-level netlist (operation 104). Next, for each block in the set of blocks, the process can create a block abstraction based on a portion of the netlist that is in the block, and create virtual pin cells in the block, wherein each virtual pin cell corresponds to a connection that crosses a boundary of the block (operation (106). The process can then simultaneously (i.e., not in a piecemeal fashion) place the top-level netlist abstraction in the layout area, the block abstractions in corresponding blocks, and the virtual pin cells in corresponding blocks (operation 108). Specifically, a computer can simultaneously load the top-level netlist abstraction, the block contours, each block abstraction, and each virtual pin cell in a memory, and execute instructions on a processor to place the top-level netlist abstraction, each block abstraction, and each virtual pin cell.

Figure 2:
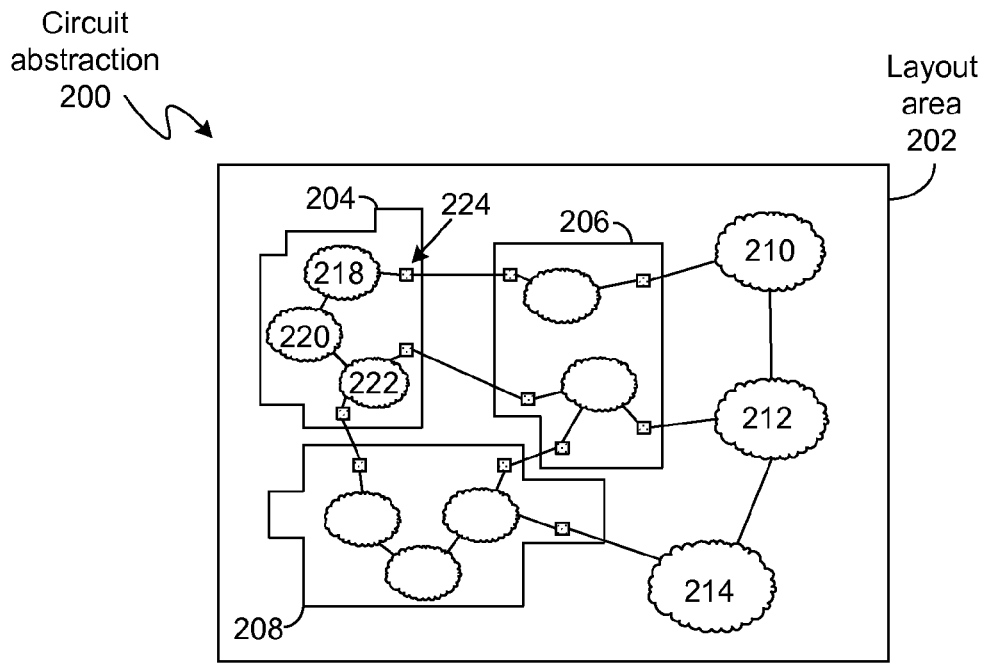
FIG. 2 illustrates a placed circuit abstraction in accordance with some embodiments described herein.

FIG. 2 illustrates placed circuit abstraction in accordance with some embodiments described herein. The netlist for a circuit design can be divided into a top-level netlist and a set of blocks, e.g., blocks 204, 206, and 208. The top-level netlist includes circuitry that is outside blocks 204, 206, and 208. A top-level abstraction can be created based on the top-level netlist. In FIG. 2, each cloud represents an abstraction of a portion of the netlist. For example, the top-level abstraction is represented by the collection of clouds 210, 212, and 214 in FIG. 2. For each block, a block abstraction can be created. For example, clouds 218, 220, and 222 together represent the block abstraction for block 204. Finally, a set of virtual pins can be created for each block, wherein each virtual pin corresponds to a connection that crosses the block's boundary. For example, virtual pin 224 has been created for block 204. Note that virtual pin 224 corresponds to a connection that crosses block 204's boundary.

Embodiments described herein can use abstractions that retain at least area and connection information. Specifically, the area of a given netlist abstraction (e.g., netlist abstraction represented by cloud 218) can be substantially equal to the total area of the standard cells that are being abstracted by the given netlist abstraction. Additionally, the abstraction of the circuit design can also retain connectivity information. Specifically, the lines between the clouds and the virtual pins in FIG. 2 represent the retained connection information between the abstractions. In this manner, circuit abstraction 200 can retain information (e.g., area and connection information) that is important for placement.

Once the netlist abstractions and virtual pins have been created, a placer (or placement engine) can place these objects. The shapes, sizes, and locations for blocks 204, 206, 208 are already known, i.e., the boundaries for blocks 204, 206, and 208 are fixed in layout area 202 as shown in FIG. 2. The placer can place the top-level abstraction (i.e., clouds 210, 212, and 214) can be placed in layout area 202 in the remaining area, i.e., the area outside blocks 204, 206, and 208. Next, the block abstractions and the virtual pins can be placed in their corresponding blocks. For example, the block abstractions (e.g., clouds 218, 220, 222) and the virtual pins (e.g., virtual pin 224) can be placed within the boundary of block 204. Note that the memory required to store the top-level abstraction, the block abstraction, and the virtual pin cells is substantially less than the memory required to store the entire netlist for the circuit design.

The placed circuit abstraction 200 can then be used to drive top-level standard cell placement and also to drive standard cell placement in each block. Specifically, the placement engine can place standard cells corresponding to the top-level netlist based on the placed virtual pin cells. For example, a set of pin placement constraints can be created based on placed virtual pin cells, and then standard cells corresponding to the netlist that is represented by clouds 210, 212, and 214 can be placed in layout area 202 based on the set of pin placement constraints. For each block in the set of blocks, a set of pin placement constraints can be created based on placed virtual pin cells and the placed standard cells in the top-level netlist, and then the portion of the netlist that is in the block can be placed based on the set of pin placement constraints. Note that, in these embodiments, the block-level standard cell placement is performed only after the top-level standard cell placement has been completed.

In some embodiments, the top-level standard cell placement and the block-level standard cell placement can be performed concurrently. Specifically, in these embodiments, for each block in the set of blocks, a set of pin placement constraints can be created based on placed virtual pin cells and the placed top-level netlist abstraction (as opposed to being created based on the placed virtual pin cells and the placed top-level standard cells), and then the portion of the netlist that is in the block can be placed based on the set of pin placement constraints. Because the pin placement constraints are not based on the placement of the top-level standard cells, the block-level standard cell placement can be performed concurrently with the top-level standard cell placement, thereby reducing the runtime required for placing the netlist. On the other hand, because the pin placement constraints are not based on the placement of the top-level standard cells, the resulting placement may not be as accurate as the placement done by the embodiments that create the pin placement constraints based on placed virtual pin cells and the placed standard cells in the top-level netlist.

Figure 3:
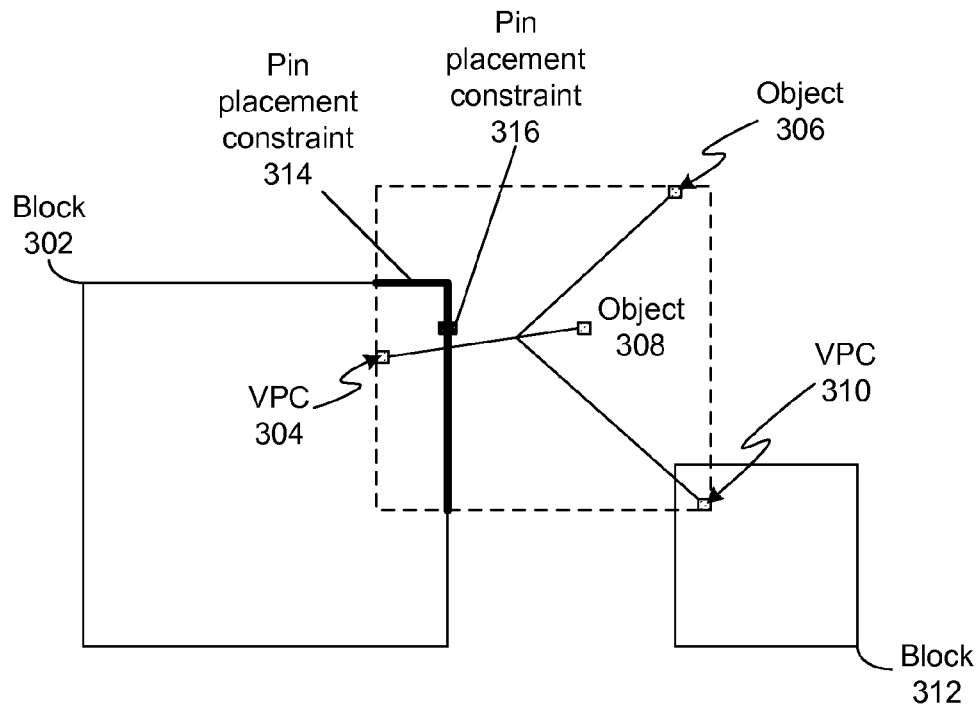
FIG. 3 illustrates how a set of pin placement constraints can be created in accordance with some embodiments described herein.

FIG. 3 illustrates how a set of pin placement constraints can be created in accordance with some embodiments described herein. Netlist abstractions (not shown in FIG. 3) within blocks 302 and 312, virtual pin cells (VPCs) 304 and 310, and top-level netlist abstraction objects 306 and 308 have been placed by the placer (e.g., during operation 108 in FIG. 1). Suppose that VPC 304 is electrically connected to VPC 310 and top-level netlist objects 306 and 308 by a net. Some embodiments can use the locations of VPCs 304 and 310 to create pin placement constraints for placing the top-level netlist. Additionally, some embodiments can use the locations of VPC 310 and top-level netlist abstraction objects 306 and 308 to create a pin placement constraint for a pin corresponding to VPC 304 in block 302.

Multiple approaches exist for creating pin placement constraints. In one approach, the VPC locations can be directly converted into pin placement constraints. For example, the locations of VPCs 304 and 310 can be converted into pin placement constraints that cause the placer to assume that the actual block pins corresponding to VPCs 304 and 310 are located in the placed locations for VPCs 304 and 310. These pin placement constraints can then be used for driving the top-level netlist placement. For example, in FIG. 3, when the placer places the standard cells for the top-level netlist, the placer can ensure that the placement of standard cells that correspond to top-level netlist abstraction object 308 are placed assuming that the actual block pins corresponding to VPCs 304 and 310 are located where these VPCs have been placed.

Other approaches may be used for creating pin placement constraints for blocks. For example, in one approach, a bounding box can be determined for the net (shown in FIG. 3 by a dashed rectangle that encompasses VPCs 304 and 310 and objects 306 and 308), and the intersection between the bounding box and block 302's boundary can be used to create the pin placement constraint 314. Specifically, pin placement constraint 314 restricts the placer to place the pin at any location on the thick line shown on block 302's boundary.

In another approach, the process can identify an edge of the block that is closest to the driver pin of the net, and restrict the pin to be placed on that edge. For example, suppose VPC 310 corresponds to a driver pin of the net, e.g., VPC 310 corresponds to the output of a logic gate, and VPC 304, and objects 306 and 308 correspond to the inputs of logic gates. Then, the process can identify the right edge of block 302 and restrict the pin corresponding to VPC 304 to be located on the right edge of block 302.

In yet another approach, the process can identify a closest external pin, and create a pin placement constraint based on the closest external pin. Specifically, the pin can be located on the block's boundary that minimizes the rectilinear distance between the pin and the closest external pin. For example, a pin associated with object 308 can be identified as the external pin that is closest to VPC 304, and pin placement constraint 316 can be created, which restricts the pin to be placed at the location shown by the solid rectangle. The above-described approaches for creating pin placement constraints have been presented only for purposes of illustration and description. They are not intended to be exhaustive or to limit the present invention to the forms disclosed.

Netlist Abstraction

Figure 4A:
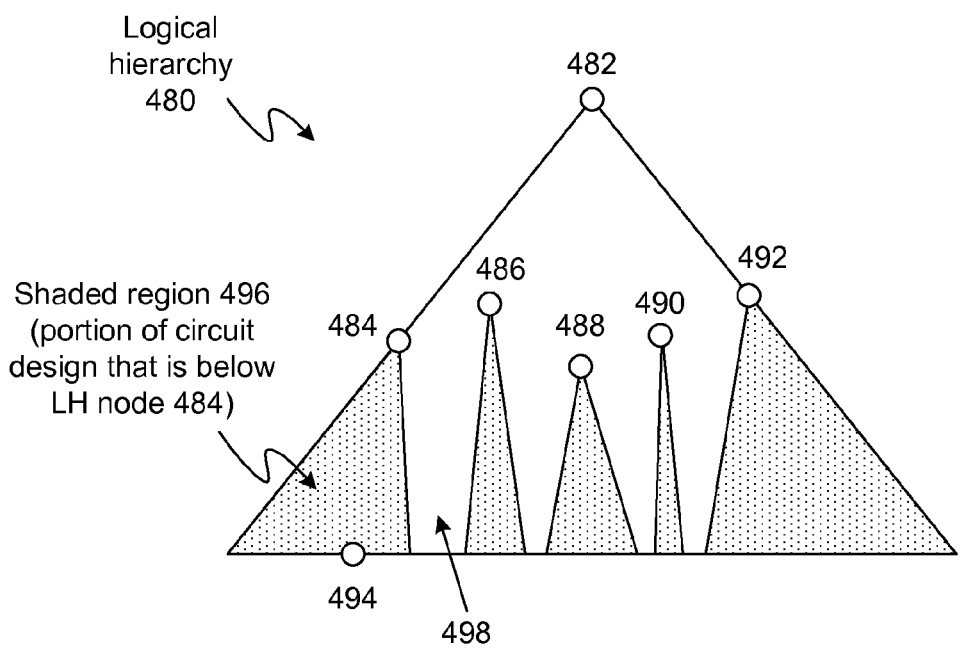
FIG. 4A illustrates a logical hierarchy of a circuit design in accordance with some embodiments described herein.

Embodiments described herein can generally use any circuit abstraction technique that retains the appropriate area and connection information. The following paragraphs describe a particular netlist abstraction technique that retains area and connection information. The following technique is being presented only for purposes of illustration and description, and is not intended to limit the present invention. Many modifications and variations of the netlist abstraction technique will be apparent to those skilled in the art. FIG. 4A illustrates a logical hierarchy of a circuit design in accordance with some embodiments described herein. Logical hierarchy 480 includes logical hierarchy nodes 482-494. Logical hierarchy node 482 can be the top-level node that can correspond to either the entire circuit design or to a physical block (e.g., a memory block, a processor block, etc.) in the circuit design. Logical hierarchy nodes 484-492 can correspond to intermediate nodes in logical hierarchy 480, and logical hierarchy node 494 can correspond to a leaf node in logical hierarchy 480. An intermediate-level node in logical hierarchy 480 can correspond to an intermediate-level entity (e.g., a multiplexer, an adder, a register bank, etc.) within the circuit design. Specifically, an intermediate-level node can correspond to a module in an HDL (e.g., SystemVerilog) file that describes the circuit design. A leaf node, e.g., logical hierarchy node 494, can correspond to a basic component of the circuit design, e.g., an inverter.

The shaded regions under logical hierarchy nodes 484, 486, 488, 490, and 492 correspond to portions of the circuit design netlist that are within each of those logical hierarchy nodes. For example, shaded region 496 corresponds to the portion of the circuit design netlist that is below logical hierarchy node 484. Nodes within shaded region 496 correspond to entities that are part of the circuitry for logical hierarchy node 484. For example, if logical hierarchy node 484 corresponds to an adder module, then shaded region 496 can correspond to the netlist for the adder module, and logical hierarchy node 494 that is within shaded region 496 can correspond to a circuit element (e.g., an inverter) that is in the adder module netlist. The non-shaded regions in logical hierarchy 480 correspond to portions of the netlist that are not within logical hierarchy nodes 484, 486, 488, 490, or 492. For example, non-shaded region 498 can include circuitry that electrically interconnects a first circuit element in hierarchy node 484 with a second circuit element in hierarchy node 486.

Figure 4B:
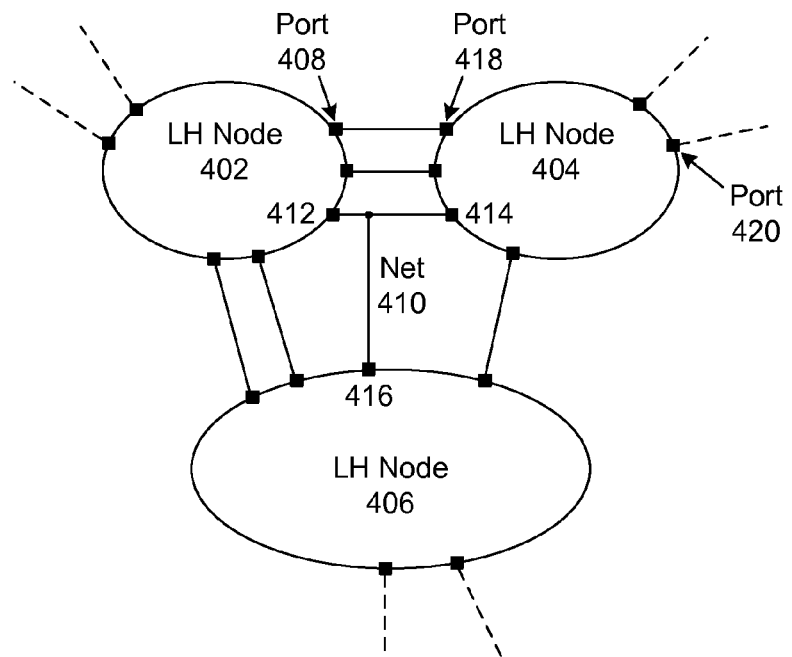
FIG. 4B illustrates a view of a netlist in accordance with some embodiments described herein.

FIG. 4B illustrates a view of a netlist in accordance with some embodiments described herein. The ovals shown in FIG. 4B represent portions of the netlist that correspond to logical hierarchy nodes 402-406. Each oval in FIG. 4B includes one or more dark squares on the oval's boundary. Each of these squares represents a port of the logical hierarchy node. A port can be used to receive a signal from a circuit element that is not within the logical hierarchy node or to provide a signal to a circuit element that is not within the logical hierarchy node. Examples of signals that can be received at a port or that can be provided by a port include, but are not limited to, clock, data, and address signals. Note that a port of a logical hierarchy node can correspond to an input pin or an output pin of a circuit element that is below the logical hierarchy node in the logical hierarchy.

A port of a logical hierarchy node can be electrically connected to ports of other logical hierarchy nodes and/or to other circuit elements in the circuit design. For example, port 408 in logical hierarchy node 402 can be electrically connected to port 418 in logical hierarchy node 404. Likewise, net 410 can be used to electrically connect ports 412, 414, and 416 in logical hierarchy nodes 402, 404, and 406, respectively. Port 420 may be electrically connected to one or more circuit elements that are not in the logical hierarchy nodes shown in FIG. 4B.

Some embodiments can create an abstraction for a portion of the netlist as follows. The embodiments can receive a netlist for a circuit design and receive a set of logical hierarchy nodes in the logical hierarchy. For example, a user may provide the set of logical hierarchy nodes to the netlist abstraction tool, e.g., by selecting circuit blocks using a graphical user interface, by providing a list of logical hierarchy node identifiers in a file, etc. Alternatively, the netlist abstraction tool may automatically (i.e., without user input) select the set of logical hierarchy nodes, e.g., based on an area threshold (e.g., the tool may automatically select the lowest logical hierarchy nodes whose areas are greater than the area threshold), a cell count threshold (e.g., the tool may automatically select the lowest logical hierarchy nodes whose cell counts are greater than the cell count threshold), a macro count threshold (e.g., the tool may automatically select the lowest logical hierarchy nodes whose macro counts are greater than the macro count threshold), etc. Next, the embodiments can create the netlist abstraction by, for each logical hierarchy node in the set of logical hierarchy nodes, replacing a portion of the netlist that is below the logical hierarchy node with a star netlist, wherein the star netlist includes a center object that is electrically connected to a set of satellite objects, wherein each satellite object corresponds to a port of the logical hierarchy node.

Figure 4C:
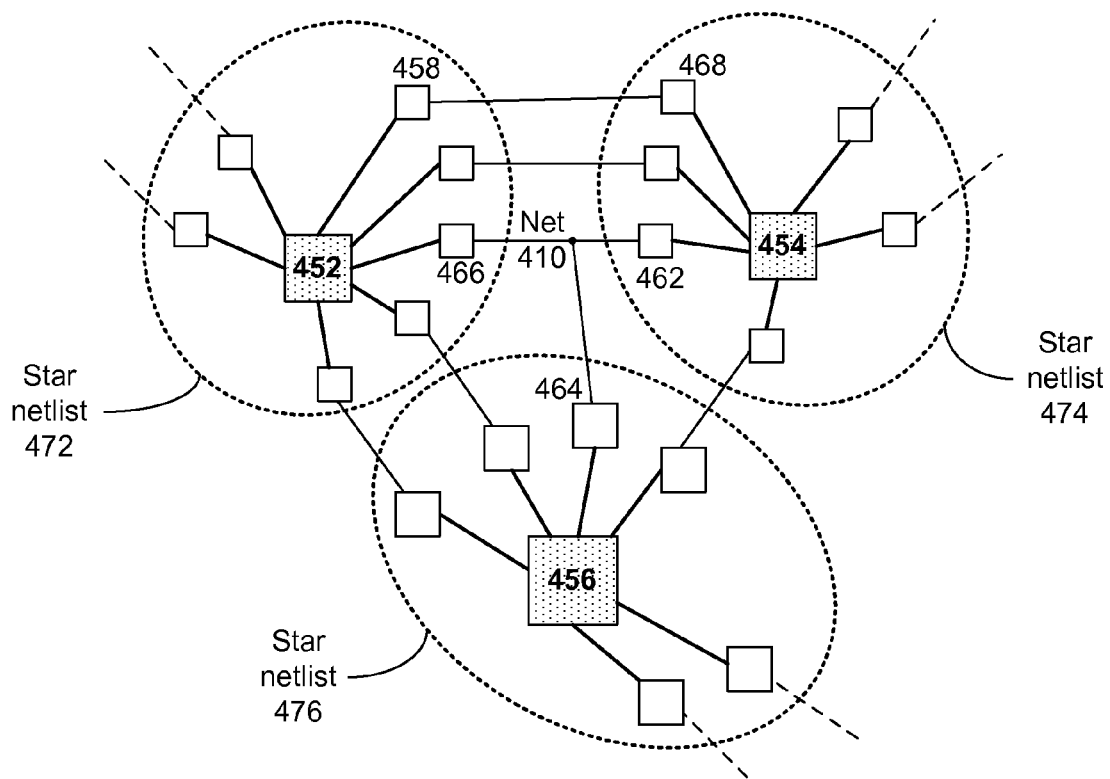
FIG. 4C illustrates how a netlist abstraction can be created from a netlist in accordance with some embodiments described herein.

FIG. 4C illustrates how a netlist abstraction can be created from a netlist in accordance with some embodiments described herein. Given a set of logical hierarchy nodes in a circuit design netlist, a netlist abstraction can be created by performing the following operations for each logical hierarchy node in the set of hierarchy nodes: (1) create a star netlist for the logical hierarchy node, wherein each star netlist includes a center object (e.g., center objects 452, 454, and 456) that is electrically connected to one or more satellite objects (e.g., satellite objects 458, 462, 464, 466, and 468), and wherein each satellite object corresponds to a port in the logical hierarchy node, and (2) replace the portion of the netlist below the logical hierarchy node with the star netlist. Note that the star netlist can be substantially smaller in size than the portion of the netlist that the star netlist replaces.

The netlist abstraction shown in FIG. 4C corresponds to the netlist shown in FIG. 4B. Star netlists 472, 474, and 476 correspond to logical hierarchy nodes 402, 404, and 406, respectively. Each star netlist includes a center object (shown as a shaded square in FIG. 4C) that is electrically connected to one or more satellite objects (shown as non-shaded squares in FIG. 4C). For example, center object 452 is electrically connected to satellite objects 458, 466, and five other satellite objects. In the original netlist, logical hierarchy node 402 may have included thousands or millions of circuit elements. Note that, in the netlist abstraction shown in FIG. 4C, the circuit elements (which can be in the thousands or millions) in logical hierarchy node 402 have been replaced by star netlist 472 (which includes only eight objects).

The electrical connections that existed in the original netlist between a port of a logical hierarchy node and other ports or circuit elements can be retained in the netlist abstraction. For example, in the original netlist shown in FIG. 4B, an electrical connection existed between port 408 and port 418. This electrical connection is retained in the netlist abstraction shown in FIG. 4C so that satellite object 458 (which corresponds to port 408) is electrically connected to satellite object 468 (which corresponds to port 418).

In some embodiments, the electrical connections between the center object and the satellite object can be assigned a sufficiently high weight so that the placement engine keeps the center object and the satellite objects in proximity to one another during placement. For example, the electrical connection between center object 452 and satellite object 458 can be assigned a weight that is greater than the weight of the electrical connection between satellite objects 458 and 468 (note that the weight of the electrical connection between satellite objects 458 and 468 can be the same as the weight that existed in the original netlist).

A placement engine typically uses a cost function to optimize the placement of circuit elements. Usually, one of the components in the cost function is a weighted sum of the electrical connection lengths (e.g., a weighted sum of the wire lengths of the nets). Therefore, if the electrical connections between the center object and the satellite objects are assigned a greater weight, then the placement engine will try to keep those objects near one another because doing so will help minimize the cost function.

Figure 4D:
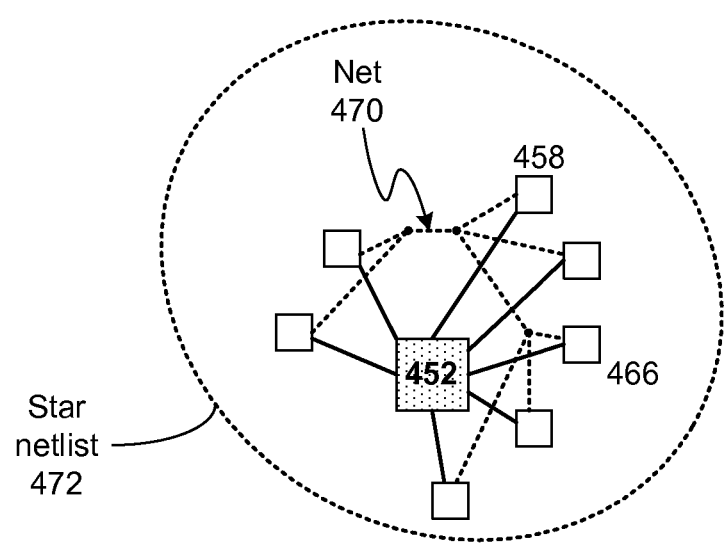
FIG. 4D illustrates a net that electrically interconnects the set of satellite objects in a star netlist with one another in accordance with some embodiments described herein.

In some embodiments described herein, a net can be added to the netlist abstraction that electrically interconnects the satellite objects in a star netlist with one another. Adding such a net can ensure that the placement engine keeps the center object and the satellite objects close to one another during placement. FIG. 4D illustrates a net that electrically interconnects the set of satellite objects in a star netlist with one another in accordance with some embodiments described herein. As shown in FIG. 4D, net 470 can be added to star netlist 472 to ensure that the placement engine keeps center object 452 and the satellite objects (e.g., satellite objects 458 and 466) close to one another during placement. Note that net 470 (shown using dotted lines in FIG. 4D) electrically interconnects all of the satellite objects with one another.

In some embodiments described herein, the sum of the areas of the center object and the satellite objects in each star netlist is substantially equal to the area of the logical hierarchy node that corresponds to the star netlist. When a placement engine places the star netlist (i.e., places the center object and the satellite objects in the star netlist), the total area covered by the star netlist should correspond to the total area of the circuitry that the star netlist represents. Otherwise, the placement engine may not generate a meaningful output when the placement engine performs placement on the netlist abstraction.

Exemplary Results

When compared with conventional placers, embodiments described herein produce very high quality circuit design placements in substantially less time. For example, to place a circuit design that has about 25 million standard cell instances, a conventional placer may require more than 200 GB of memory and may take many days to complete. In contrast, embodiments described herein can place the same circuit design with a higher quality in about an hour and use less than 10 GB of memory.

Figure 5A:
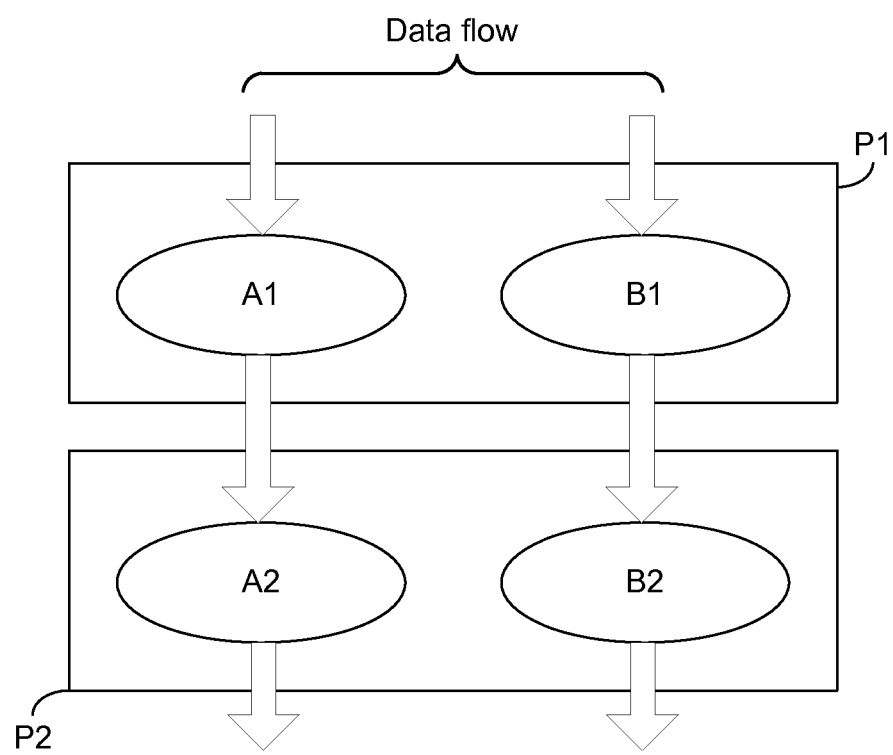
FIGS. 5A-5C compare an exemplary placement generated by conventional placers with an exemplary placement generated by some embodiments described herein.
Figure 5B:
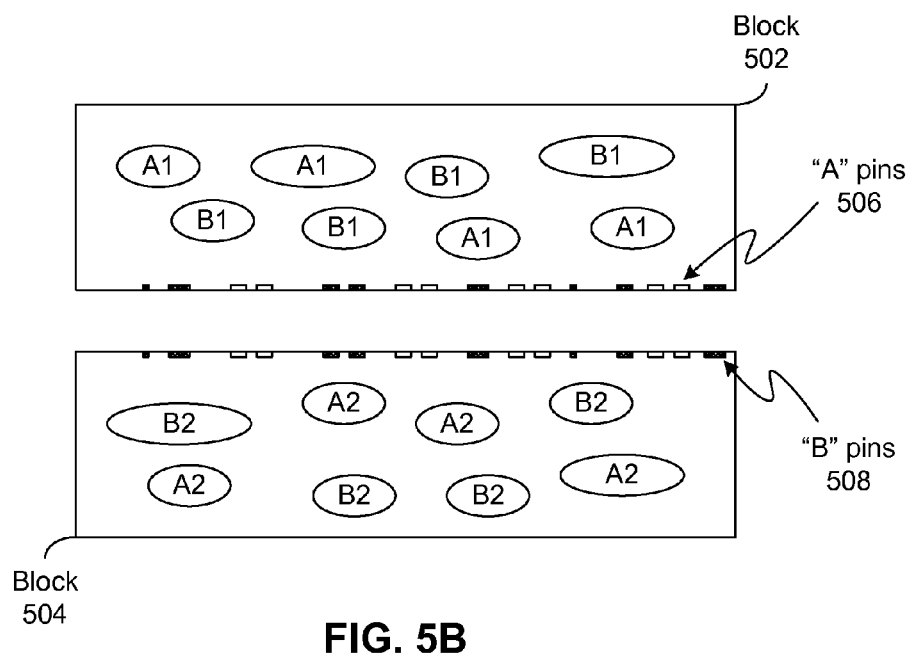
Figure 5C:
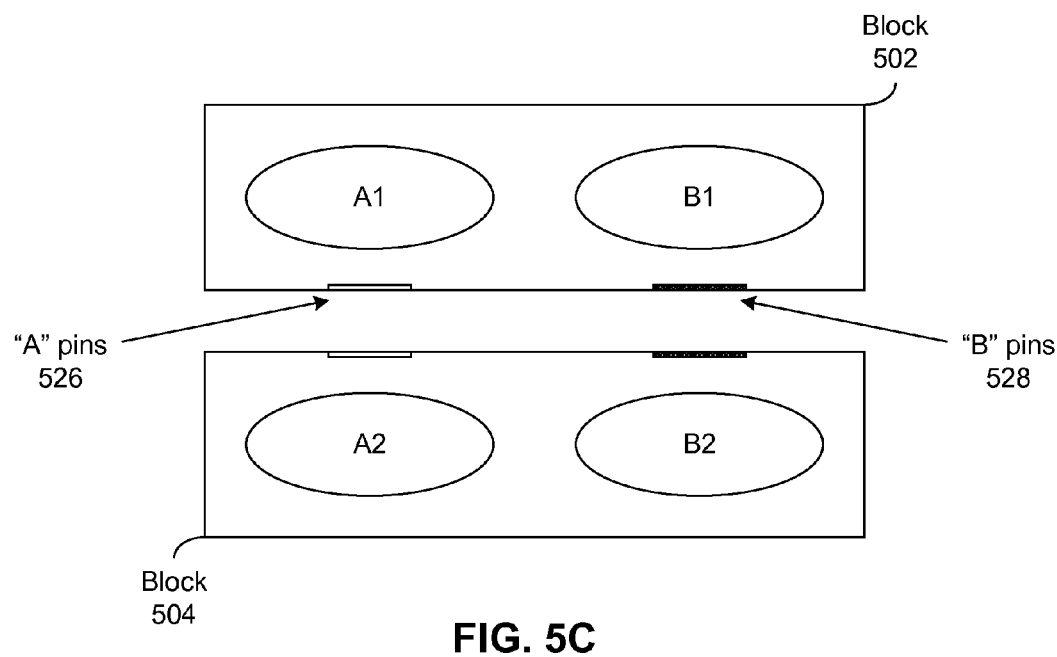

FIGS. 5A-5C compare an exemplary placement generated by conventional placers with an exemplary placement generated by some embodiments described herein. Let us assume that the circuit design includes blocks P1 and P2. Block P1 includes circuitries A1 and B1, and block P2 includes circuitries A2 and B2, and the arrows in FIG. 5A show the data flow through the circuit design. Note that FIG. 5A is a logical representation of the circuit design, i.e., in FIG. 5A, circuitries A1, A2, B1, and B2 have not been placed. Based on the data flow pattern, it is expected that the physical blocks corresponding to blocks P1 and P2 will have many pins (called "A" pins hereinafter) for interconnecting circuitries A1 and A2, and also will have many pins (called "B" pins hereinafter) for interconnecting circuitries B1 and B2. Additionally, let us assume that there are relatively few connections between circuitries A1 and B1, and that there are relatively few connections between circuitries A2 and B2.

FIG. 5B illustrates a placement that may be generated by a conventional placer. As shown in FIG. 5B, the "A1," "A2," "B1," and "B2" circuitry regions (depicted by ovals in FIG. 5B), and the "A" pins (e.g., "A" pins 506 depicted by unshaded rectangles) and the "B" pins (e.g., "B" pins 508 depicted by shaded rectangles) are intermixed and spread out over physical blocks 502 and 504. Note that each shaded and unshaded rectangle corresponds to one or more closely spaced pins. The "A1," "B1," "A2," and "B2" circuitry regions, and "A" pins and "B" pins may not separate even after multiple iterations.

In contrast, FIG. 5C illustrates a placement that may be generated by some embodiments described herein. Note that the "A1," "B1," "A2," and "B2" circuitry regions, and "A" pins (e.g., "A" pins 526) and the "B" pins (e.g., "B" pins 528) are cleanly separated from each other. The reason for this clean separation is that the connection information between circuitries A1 and A2, as well as the connection information between circuitries B1 and B2, is retained in the circuit abstraction, and therefore the placement performed on the circuit abstraction correctly separates the "A" and "B" circuitry and pin locations. The routing solution and the standard cell placement in FIG. 5C is also expected to be of a higher quality than those in FIG. 5B due to the clean separation between the "A" and "B" circuitry and pins.

Computer System

Figure 6:
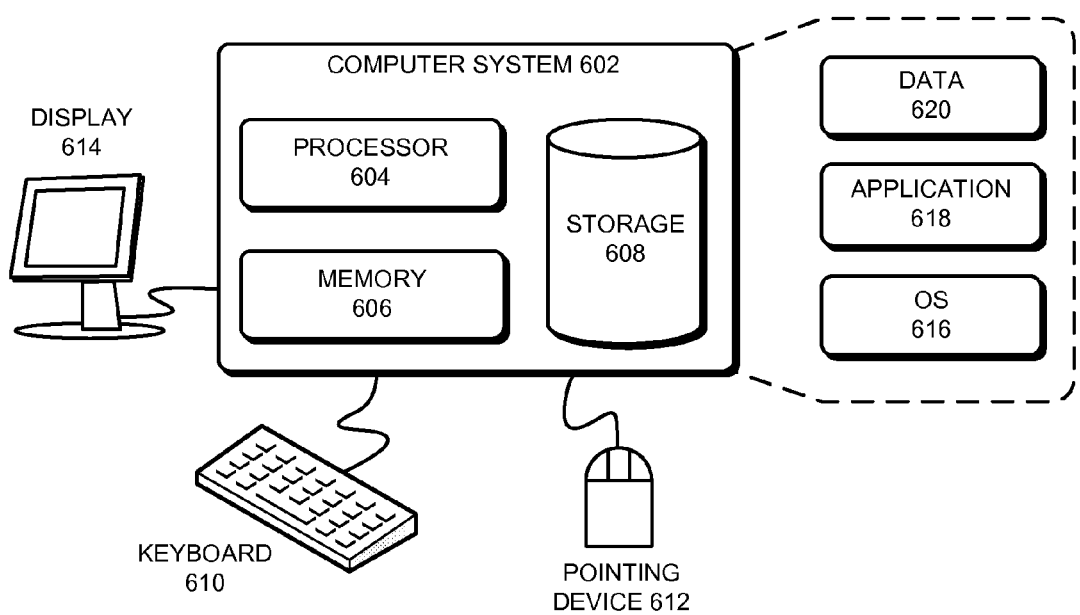
FIG. 6 illustrates a computer system in accordance with some embodiments described herein.

FIG. 6 illustrates a computer system in accordance with some embodiments described herein. Computer system 602 can include processor 604, memory 606, and storage device 608. Specifically, memory locations in memory 606 can be addressable by processor 604, thereby enabling processor 604 to access (e.g., via load/store instructions) and manipulate (e.g., via logical/floating point/arithmetic instructions) the data stored in memory 606. Computer system 602 can be coupled to display device 614, keyboard 610, and pointing device 612. Storage device 608 can store operating system 616, application 618, and data 620. Data 620 can include input required by application 618 and/or output generated by application 618.

Computer system 602 may automatically (or with user intervention) perform one or more operations that are implicitly or explicitly described in this disclosure. For example, computer system 602 can load application 618 into memory 606, and application 618 can then be used to place a circuit design using techniques described herein, thereby substantially improving performance and quality of results.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for placing a circuit design in a layout area to obtain a placed circuit design, the method comprising:
   receiving a netlist for the circuit design, wherein the netlist for the circuit design is divided into a set of blocks and a top-level netlist;
   creating, using a processor, a top-level netlist abstraction based on the top-level netlist; and
   for each block in the set of blocks,
      creating a block abstraction based on a portion of the netlist that is in the block, and
      creating virtual pin cells in the block, wherein each virtual pin cell corresponds to a connection that crosses a boundary of the block;
   placing the top-level netlist abstraction in the layout area, the block abstractions in corresponding blocks, and the virtual pin cells in corresponding blocks;
   creating a first set of pin placement constraints for driving the top-level netlist placement based on the placed virtual pin cells;
   placing the top-level netlist based on the first set of pin placement constraints; and
   for each block in the set of blocks,
      creating a second set of pin placement constraints for driving block placement based on the placed virtual pin cells and the placed top-level netlist, and
      placing the netlist for the circuit design that is within the block based on the second set of pin placement constraints;
   wherein the placed circuit design is implemented as a physical integrated circuit once the placed circuit design undergoes fabrication.

2. The method of claim 1, wherein said creating the first set of pin placement constraints comprises creating a pin placement constraint that restricts a pin corresponding to a virtual pin cell or object to be placed at a location where the virtual pin cell or object was placed.

3. The method of claim 1, wherein said creating the second set of pin placement constraints comprises:
   determining a bounding box for a net that electrically connects a virtual pin cell in the block to at least one virtual pin cell or object external to the block; and
   creating a pin placement constraint based on an intersection between the bounding box and the block.

4. The method of claim 1, wherein said creating the second set of pin placement constraints comprises:
   identifying an edge of the block that is closest to a driver pin in a net that electrically connects a virtual pin cell in the block to at least one virtual pin cell or object external to the block; and
   creating a pin placement constraint based on the identified edge of the block.

5. The method of claim 1, wherein said creating the second set of pin placement constraints comprises:
   identifying an external virtual pin cell or object that is closest to a virtual pin cell in the block, and that is on a net that electrically connects the virtual pin cell with one or more external virtual pin cells and/or objects; and
   creating a pin placement constraint based on the identified external virtual pin cell.

6. The method of claim 1, wherein circuit elements in the netlist are organized in a logical hierarchy (LH);
   wherein said creating the top-level netlist abstraction based on a top-level netlist comprises:
      identifying a first set of LH nodes that is in the top-level netlist; and
      creating the top-level netlist abstraction by, for each LH node in the first set of LH nodes, replacing a portion of the netlist that is below the LH node in the LH with a star netlist, wherein the star netlist includes a center object that is electrically connected to a set of satellite objects, wherein each satellite object corresponds to a port of the LH node; and
   wherein said creating the block abstraction based on the portion of the netlist that is in the block comprises:
      identifying a second set of LH nodes that is in the block; and
      creating the block abstraction by, for each LH node in the second set of LH nodes, replacing a portion of the netlist that is below the LH node in the LH with a star netlist, wherein the star netlist includes a center object that is electrically connected to a set of satellite objects, wherein each satellite object corresponds to a port of the LH node.

7. The method of claim 1, further comprising:
creating a first set of pin placement constraints for driving the top-level netlist placement based on the placed virtual pin cells;
placing the top-level netlist based on the first set of pin placement constraints; and
for each block in the set of blocks, and concurrently to said creating the first set of pin placement constraints and placing the top-level netlist,
creating a second set of pin placement constraints for driving block placement based on the placed virtual pin cells and the placed top-level netlist abstraction, and
placing the netlist for the circuit design that is within the block based on the second set of pin placement constraints.

8. A non-transitory computer-readable storage medium storing instructions that, when executed by a computer, cause the computer to perform a method for placing a circuit design in a layout area to obtain a placed circuit design, the method comprising:
receiving a netlist for the circuit design, wherein the netlist for the circuit design is divided into a set of blocks and a top-level netlist;
creating a top-level netlist abstraction based on the top-level netlist;
for each block in the set of blocks,
creating a block abstraction based on a portion of the netlist that is in the block, and
creating virtual pin cells in the block, wherein each virtual pin cell corresponds to a connection that crosses a boundary of the block;
placing the top-level netlist abstraction in the layout area, the block abstractions in corresponding blocks, and the virtual pin cells in corresponding blocks;
creating a first set of pin placement constraints for driving the top-level netlist placement based on the placed virtual pin cells;
placing the top-level netlist based on the first set of pin placement constraints; and
for each block in the set of blocks,
creating a second set of pin placement constraints for driving block placement based on the placed virtual pin cells and the placed top-level netlist, and
placing the netlist for the circuit design that is within the block based on the second set of pin placement constraints;
wherein the placed circuit design is implemented as a physical integrated circuit once the placed circuit design undergoes fabrication.

9. The non-transitory computer-readable storage medium of claim 8, wherein said creating the first set of pin placement constraints comprises creating a pin placement constraint that restricts a pin corresponding to a virtual pin cell or object to be placed at a location where the virtual pin cell or object was placed.

10. The non-transitory computer-readable storage medium of claim 8, wherein said creating the second set of pin placement constraints comprises:
determining a bounding box for a net that electrically connects a virtual pin cell in the block to at least one virtual pin cell or object external to the block; and
creating a pin placement constraint based on an intersection between the bounding box and the block.

11. The non-transitory computer-readable storage medium of claim 8, wherein said creating the second set of pin placement constraints comprises:
identifying an edge of the block that is closest to a driver pin in a net that electrically connects a virtual pin cell in the block to at least one virtual pin cell or object external to the block; and
creating a pin placement constraint based on the identified edge of the block.

12. The non-transitory computer-readable storage medium of claim 8, wherein said creating the second set of pin placement constraints comprises:
identifying an external virtual pin cell or object that is closest to a virtual pin cell in the block, and that is on a net that electrically connects the virtual pin cell with one or more external virtual pin cells and/or objects; and
creating a pin placement constraint based on the identified external virtual pin cell.

13. The non-transitory computer-readable storage medium of claim 8, wherein circuit elements in the netlist are organized in a logical hierarchy (LH);
wherein said creating the top-level netlist abstraction based on a top-level netlist comprises:
identifying a first set of LH nodes that is in the top-level netlist; and
creating the top-level netlist abstraction by, for each LH node in the first set of LH nodes, replacing a portion of the netlist that is below the LH node in the LH with a star netlist, wherein the star netlist includes a center object that is electrically connected to a set of satellite objects, wherein each satellite object corresponds to a port of the LH node; and
wherein said creating the block abstraction based on the portion of the netlist that is in the block comprises:
identifying a second set of LH nodes that is in the block; and
creating the block abstraction by, for each LH node in the second set of LH nodes, replacing a portion of the netlist that is below the LH node in the LH with a star netlist, wherein the star netlist includes a center object that is electrically connected to a set of satellite objects, wherein each satellite object corresponds to a port of the LH node.

14. The non-transitory computer-readable storage medium of claim 8, further comprising:
creating a first set of pin placement constraints for driving the top-level netlist placement based on the placed virtual pin cells;
placing the top-level netlist based on the first set of pin placement constraints; and
for each block in the set of blocks, and concurrently to said creating the first set of pin placement constraints and placing the top-level netlist,
creating a second set of pin placement constraints for driving block placement based on the placed virtual pin cells and the placed top-level netlist abstraction, and
placing the netlist for the circuit design that is within the block based on the second set of pin placement constraints.

15. An apparatus, comprising:
a processor; and
a memory storing instructions that, when executed by the processor, cause the processor to perform a method for placing a circuit design in a layout area to obtain a placed circuit design, the method comprising:

receiving a netlist for the circuit design, wherein the netlist for the circuit design is divided into a set of blocks and a top-level netlist;

creating a top-level netlist abstraction based on the top-level netlist;

for each block in the set of blocks,
creating a block abstraction based on a portion of the netlist that is in the block, and
creating virtual pin cells in the block, wherein each virtual pin cell corresponds to a connection that crosses a boundary of the block;

placing the top-level netlist abstraction in the layout area, the block abstractions in corresponding blocks, and the virtual pin cells in corresponding blocks;

creating a first set of pin placement constraints for driving the top-level netlist placement based on the placed virtual pin cells;

placing the top-level netlist based on the first set of pin placement constraints; and for each block in the set of blocks, and concurrently to said creating the first set of pin placement constraints and placing the top-level netlist,
creating a second set of pin placement constraints for driving block placement based on the placed virtual pin cells and the placed top-level netlist abstraction, and
placing the netlist for the circuit design that is within the block based on the second set of pin placement constraints;

wherein the placed circuit design is implemented as a physical integrated circuit once the placed circuit design undergoes fabrication.

* * * * *